(12) United States Patent
Naito (10) Patent No.: US 10,908,599 B2
(45) Date of Patent: Feb. 2, 2021

(54) TESTING DEVICE AND MACHINE LEARNING DEVICE

(71) Applicant: FANUC Corporation, Yamanashi (JP)

(72) Inventor: Genzo Naito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 163 days.

(21) Appl. No.: 16/169,634

(22) Filed: Oct. 24, 2018

(65) Prior Publication Data

US 2019/0129398 A1 May 2, 2019

(30) Foreign Application Priority Data

Oct. 31, 2017 (JP) ................................ 2017-210168

(51) Int. Cl.
*G05B 19/418* (2006.01)
*G05B 13/02* (2006.01)
*G06N 20/00* (2019.01)
*G05B 23/02* (2006.01)
*G06K 9/62* (2006.01)

(52) U.S. Cl.
CPC ..... *G05B 19/41885* (2013.01); *G05B 13/027* (2013.01); *G05B 23/0256* (2013.01); *G06K 9/6262* (2013.01); *G06N 20/00* (2019.01)

(58) Field of Classification Search
CPC ............ G05B 19/41885; G05B 13/027; G05B 23/0256; G06N 20/00; G06N 3/0481; G06N 3/006; G06N 3/08; G06K 9/6262; G06K 2209/19; G06K 9/6271
See application file for complete search history.

(56) References Cited

U.S. PATENT DOCUMENTS

| | | | |
|---|---|---|---|
| 9,671,777 B1 | 6/2017 | Aichele et al. | |
| 9,786,251 B1* | 10/2017 | Gordin | ...................... G09G 5/02 |
| 2004/0059977 A1* | 3/2004 | Liau | ............... G01R 31/318371 |
| | | | 714/741 |
| 2008/0082968 A1 | 4/2008 | Chang et al. | |
| 2012/0203493 A1* | 8/2012 | Dobson | ................ H01B 7/0009 |
| | | | 702/109 |
| 2017/0075784 A1 | 3/2017 | Nakanishi et al. | |

(Continued)

FOREIGN PATENT DOCUMENTS

| | | |
|---|---|---|
| CN | 201645254 U | 11/2010 |
| CN | 102736557 A | 10/2012 |

(Continued)

*Primary Examiner* — Thomas C Lee
*Assistant Examiner* — Michael Tang
(74) *Attorney, Agent, or Firm* — Hauptman Ham, LLP (57) ABSTRACT

A testing device performing a worst case scenario test includes a machine learning device and the machine learning device observes data representing a test item and data representing an operation state and specifications of a manufacturing machine as state variables representing a current state of an environment. Further, the machine learning device acquires determination data representing a suitability determination result of an operation state of the manufacturing machine obtained when the test item is executed, and performs learning by using the state variables and the determination data in a state where manufacturing machine operation state data and manufacturing machine specification data are associated with test item data.

8 Claims, 6 Drawing Sheets

(56) References Cited

U.S. PATENT DOCUMENTS

| | | |
|---|---|---|
| 2017/0090430 A1 | 3/2017 | Nakazawa |
| 2017/0154283 A1 | 6/2017 | Kawai et al. |
| 2017/0177455 A1 | 6/2017 | Dusanapudi et al. |
| 2017/0228644 A1 | 8/2017 | Kurokawa |

FOREIGN PATENT DOCUMENTS

| | | | | |
|---|---|---|---|---|
| CN | 104021242 A | 9/2014 | | |
| CN | 107045293 A | 8/2017 | | |
| JP | 2012-14584 A | 1/2012 | | |
| JP | 2014-203125 A | 10/2014 | | |
| JP | 5964488 B1 * | 8/2016 | ............... | H02H 3/00 |
| JP | 5969676 B1 * | 8/2016 | ............. | G06N 20/00 |
| JP | 5997330 B1 * | 9/2016 | ............ | G01M 13/00 |
| JP | 2017-049627 A | 3/2017 | | |
| JP | 2017-058838 A | 3/2017 | | |
| JP | 2017-064837 A | 4/2017 | | |
| JP | 2017-102613 A | 6/2017 | | |

* cited by examiner

TESTING DEVICE AND MACHINE LEARNING DEVICE

RELATED APPLICATIONS

The present application claims priority of Japanese Application Number 2017-210168, filed on Oct. 31, 2017, the disclosure of which is hereby incorporated by reference herein in its entirety.

BACKGROUND OF THE INVENTION

1. Field of the Invention

The present invention relates to a testing device and a machine learning device and especially relates to a testing device and a machine learning device that are capable of automatically setting a worst case scenario test.

2. Description of the Related Art

In development of a manufacturing machine such as a machine tool and a robot, a worst case scenario test is preliminarily performed so as to enhance reliability of the manufacturing machine. The worst case scenario test is processing of testing whether or not abnormality occurs in operation of a manufacturing machine when a signal, a current value, and the like deviated from a range set in specifications or the like are inputted and when the manufacturing machine is operated in accordance with unexpected operation procedures. Contents of this worst case scenario test (that is, test items and test procedures) are determined by a person in charge of determining contents of a worst case scenario test, based on his/her experience.

As a prior art technique for supporting an operation in such testing processing, Japanese Patent Application Laid-Open No. 2014-203125, for example, discloses a technique for patterning control data for controlling a device which is a testing object. Further, Japanese Patent Application Laid-Open No. 2012-014584 discloses a testing device which automatically tests a controller.

However, since only tests based on test items, which are created based on experience of a person in charge of the tests and based on past failure cases, are mainly performed in the worst case scenario test, it is difficult to perform a comprehensive worst case scenario test foreseeing an unexpected situation. Thus, there is a problem in that failures occur on site after shipping of manufacturing machines.

SUMMARY OF THE INVENTION

An object of the present invention is to provide a testing device and a machine learning device that are capable of performing a comprehensive and efficient worst case scenario test.

The testing device according to the present invention introduces a machine learning device, which generates an input (test item) to be imparted to a manufacturing machine in a worst case scenario test and evaluates a result of the test based on the inputs, thereinto, solving the above-mentioned problem. The machine learning device introduced into the testing device according to the present invention determines input voltage and input current to be imparted to the manufacturing machine based on a learning result and improves evaluation of the test item when an output of the machine becomes unstable due to the inputs. The machine learning device introduced into the testing device according to the present invention comprehensively searches for inputs (malicious operations) which make a machine unstable, enabling grasping of malicious operations, which are not expected by developers of the manufacturing machine, at the development stage. The developers of the manufacturing machine can improve the machine and perform preventive maintenance of the machine based on the information, thus preventing occurrences of failures in unexpected situations after launching of products.

A testing device according to an aspect of the present invention is configured to determine a test item with respect to an operation state of the manufacturing machine and specifications of the manufacturing machine. The testing device includes a machine learning device that learns determination of the test item with respect to the manufacturing machine. The machine learning device includes: a state observation unit that observes test item data representing the test item, manufacturing machine operation state data representing an operation state of the manufacturing machine, and manufacturing machine specification data representing specifications of the manufacturing machine, as a state variable representing a current state of an environment; a determination data acquisition unit that acquires determination data representing a suitability determination result of an operation state of the manufacturing machine, the suitability determination result being obtained when the test item is executed; and a learning unit that performs learning by using the state variable and the determination data in a state where the manufacturing machine operation state data and the manufacturing machine specification data are associated with the test item data.

The learning unit may include a reward calculation unit that obtains a reward related to the suitability determination result, and a value function update unit that updates a function representing a value of the test item with respect to an operation state of the manufacturing machine and specifications of the manufacturing machine, by using the reward. The reward calculation unit may calculate a higher reward as an operation of the manufacturing machine becomes more unstable.

The learning unit may calculate the state variable and the determination data in a multilayer structure.

A testing device according to another aspect of the present invention is configured to determining a test item with respect to an operation state of the manufacturing machine and specifications of the manufacturing machine and the testing device comprises a machine learning device that has learned determination of the test item with respect to the manufacturing machine. The machine learning device includes: a state observation unit that observes test item data representing the test item, manufacturing machine operation state data representing an operation state of the manufacturing machine, and manufacturing machine specification data representing specifications of the manufacturing machine, as a state variable representing a current state of an environment; a learning unit that has performed learning in a state where the manufacturing machine operation state data and the manufacturing machine specification data are associated with the test item data; and an inference result output unit that outputs an operation command of a test based on the test item, based on a state variable observed by the state observation unit and a learning result obtained by the learning unit.

The machine learning device may exist in a cloud server.

A machine learning device according to still another aspect of the present invention is configured to learn determination of a test item for testing a manufacturing machine.

The machine learning device includes: a state observation unit that observes test item data representing the test item, manufacturing machine operation state data representing an operation state of the manufacturing machine, and manufacturing machine specification data representing specifications of the manufacturing machine, as a state variable representing a current state of an environment; a determination data acquisition unit that acquires determination data representing a suitability determination result of an operation state of the manufacturing machine, the suitability determination result being obtained when the test item is executed; and a learning unit that performs learning by using the state variable and the determination data in a state where the manufacturing machine operation state data and the manufacturing machine specification data are associated with the test item data.

A machine learning device according to yet another aspect of the present invention is configured to learn determination of a test item for testing a manufacturing machine. The machine learning device includes: a state observation unit that observes test item data representing the test item, manufacturing machine operation state data representing an operation state of the manufacturing machine, and manufacturing machine specification data representing specifications of the manufacturing machine, as a state variable representing a current state of an environment; a learning unit that performs learning in a state where the manufacturing machine operation state data and the manufacturing machine specification data are associated with the test item data; and an inference result output unit that outputs an operation command of a test based on the test item, based on a state variable observed by the state observation unit and a learning result obtained by the learning unit.

The present invention enables detection of failures and bugs (of software), for example, which are not expected by developers of a manufacturing machine and enables efficient execution of a worst case scenario test.

DETAILED DESCRIPTION OF THE PREFERRED EMBODIMENT

Figure 1:
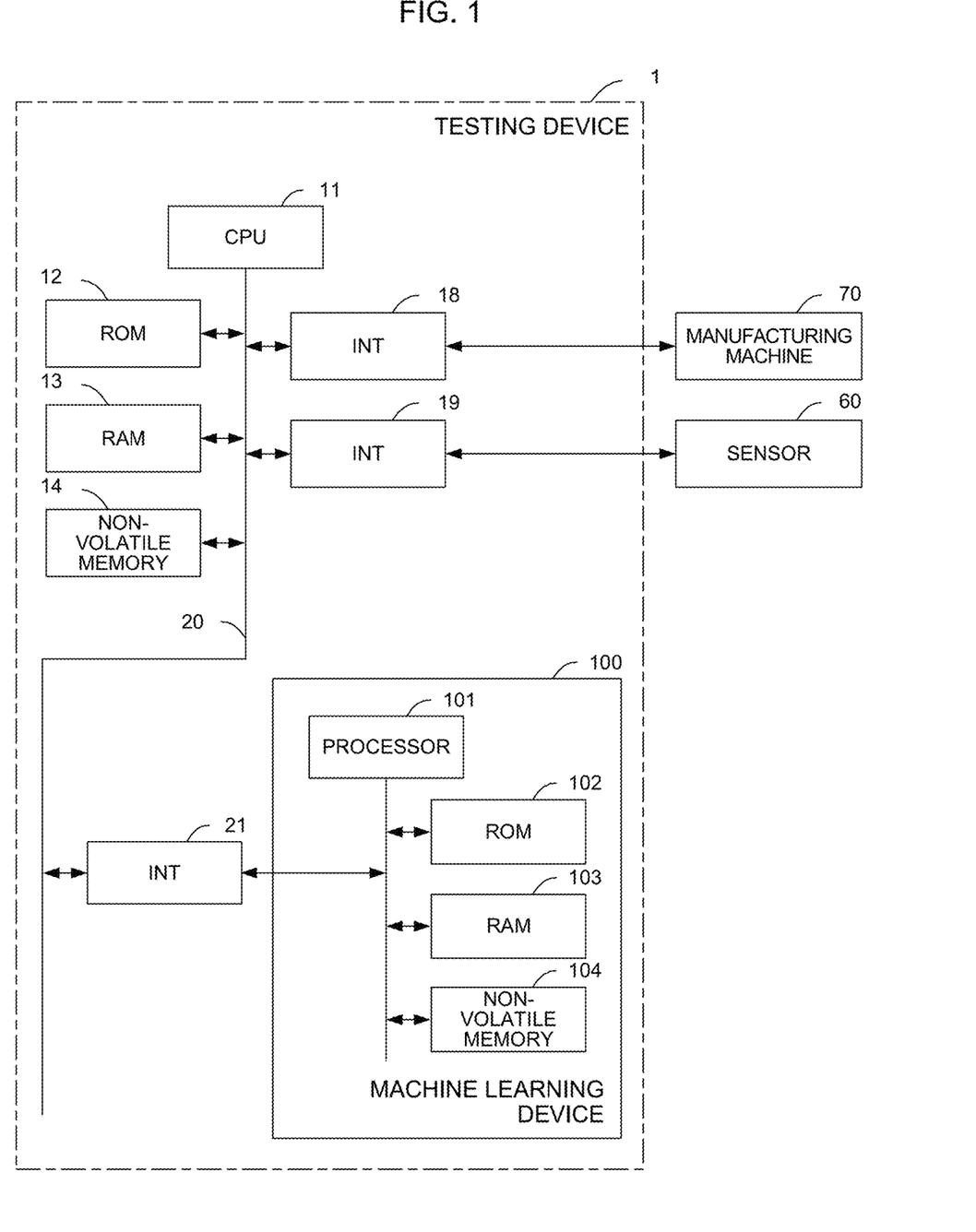
FIG. 1 is a hardware configuration diagram schematically illustrating a testing device according to a first embodiment.

FIG. 1 is a hardware configuration diagram schematically illustrating chief parts of a testing device according to a first embodiment.

A testing device 1 can be mounted as a testing device that controls signal input, a power source, and the like with respect to a manufacturing machine such as a robot and a machine tool so as to test the manufacturing machine, mounted as a part of a controller of a manufacturing machine such as a robot and a machine tool, or mounted as a part of a computer such as a cell computer, a host computer, and a cloud server that is connected with a manufacturing machine via a network, for example. A CPU 11 included in this testing device 1 is a processor entirely controlling the testing device 1. The CPU 11 reads a system program stored in a ROM 12 via a bus 20 and controls the whole of the testing device 1 in accordance with the system program. The RAM 13 temporarily stores temporary calculation data and display data and various kinds of data which are inputted by an operator via an input unit, which is not shown, for example.

A non-volatile memory 14 is backed up by a battery, which is not shown, for example, and thus, the non-volatile memory 14 is configured as a memory whose storage state is maintained even when the testing device 1 is turned off. The non-volatile memory 14 stores, for example, various kinds of data which are inputted by an operator via an input unit, which is not shown, (a list of control signals of a manufacturing machine 70 and ranges of values that the signals can take, and specifications of the manufacturing machine 70 including a property of a motor for driving a driving unit of the manufacturing machine 70, for example), and control programs which are inputted via an interface, which is not shown. The programs and the various kinds of data stored in the non-volatile memory 14 may be developed on the RAM 13 when the programs and the data are executed/used. Further, various kinds of system programs such as a known analysis program (including a system program for controlling exchange with a machine learning device 100 which will be described later) are preliminarily written in the ROM 12.

A sensor 60 is provided to externally observe the manufacturing machine 70. For this sensor 60, a visual sensor, a sound sensor, a temperature sensor, a distance sensor, and the like, for example, may be used. The sensor 60 detects information which is related to an operation of the manufacturing machine 70 and which cannot be detected by the manufacturing machine 70 by itself and the sensor 60 notifies the CPU 11 of the detection result via an interface 18.

The manufacturing machine 70 is a machine which is an object of a worst case scenario test and may be a machining machine such as a robot, a machine tool, an electric discharge machine, and an injection molding machine, for example. This manufacturing machine 70 is configured to be capable of receiving an operation command in a signal, for example, from the CPU 11 via an interface 19 and controlling each unit. Further, the manufacturing machine 70 detects a current value or the like supplied to a sensor, a motor, or the like provided to each unit and notifies the CPU 11 of the current value or the like via the interface 19.

An interface 21 is an interface for connecting the testing device 1 with the machine learning device 100. The machine learning device 100 includes a processor 101 that entirely controls the machine learning device 100, a ROM 102 that stores system programs and the like, a RAM 103 that performs temporary storage in each processing related to machine learning, and a non-volatile memory 104 that is used for storing learning models and the like. The machine learning device 100 is capable of observing various information (a list of control signals of the manufacturing machine 70 and ranges of values that the signals can take, specifications of the manufacturing machine 70 including a property of a motor for driving a driving unit of the manufacturing machine 70, and an operation state of the manufacturing machine 70 acquired from the sensor 60 and the manufacturing machine 70, for example) acquirable in the testing device 1, via the interface 21. Further, the testing device 1 controls the manufacturing machine 70 in response to an operation command which is outputted from the machine learning device 100 and is related to a test for the manufacturing machine 70.

Figure 2:
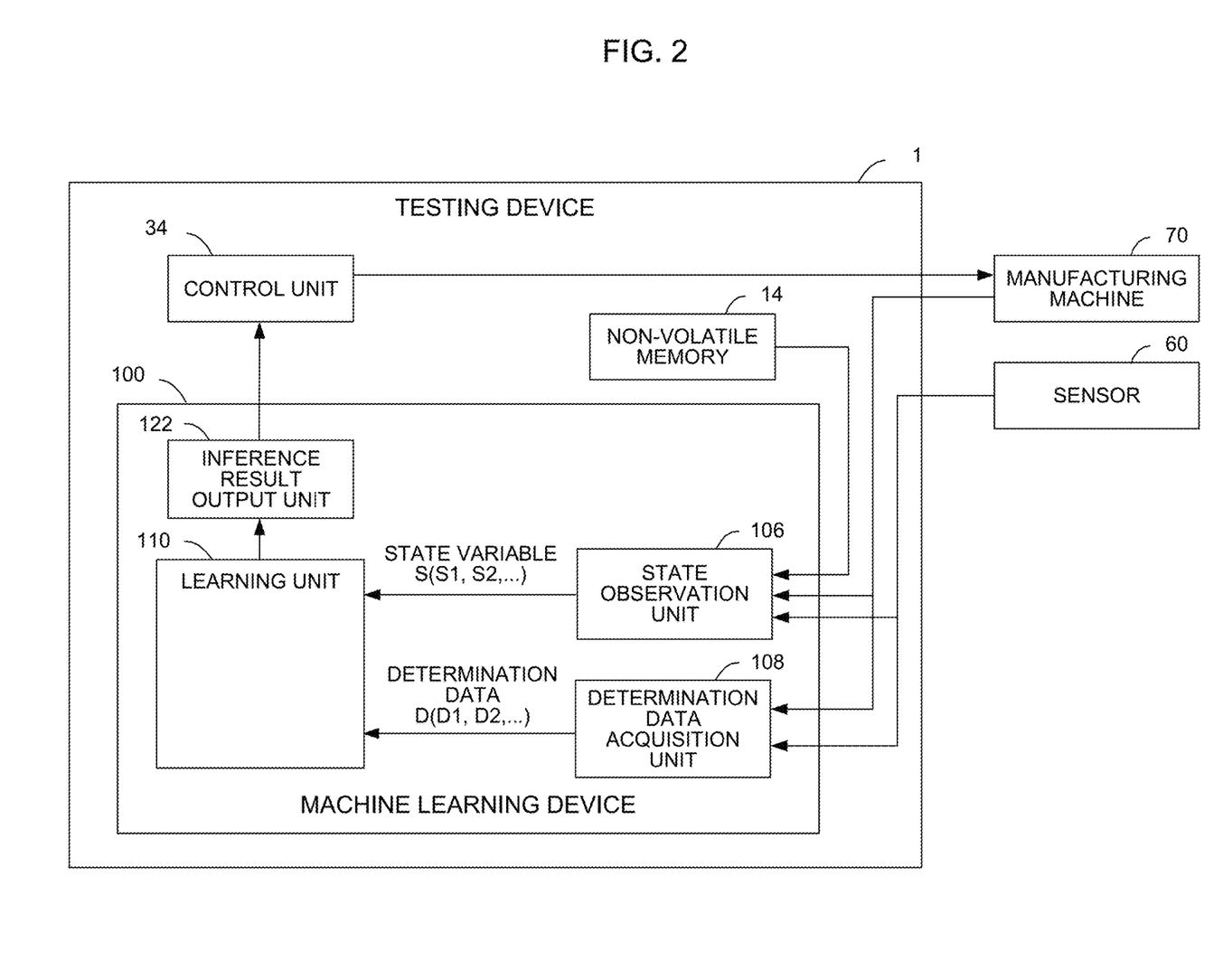
FIG. 2 is a functional block diagram schematically illustrating the testing device according to the first embodiment.

FIG. 2 is a functional block diagram schematically illustrating the testing device 1 and the machine learning device 100 according to the first embodiment.

Functional blocks illustrated in FIG. 2 are realized when the CPU 11 included in the testing device 1 and the processor 101 of the machine learning device 100 which are illustrated in FIG. 1 execute respective system programs and respectively control an operation of each unit of the testing device 1 and the machine learning device 100.

The testing device 1 according to the present embodiment includes a control unit 34 that outputs an operation command of a test to the manufacturing machine 70 based on an inference result outputted from the machine learning device 100. Examples of the operation command of a test outputted from the control unit 34 include a combination of a control command to a power source (rapid voltage rise, rapid voltage drop, and instantaneous interruption, for example), a list of parameter values within and out of a settable range defined in specifications of the manufacturing machine 70 for each unit of the manufacturing machine 70, current control with respect to each motor provided to the manufacturing machine 70, a command to peripheral devices provided to the manufacturing machine 70, and the like. Not limited to this, various operation commands which can be controlled by functions and specifications, for example, of the manufacturing machine 70 may be outputted.

The machine learning device 100 according to the present embodiment includes software (a learning algorithm, for example) and hardware (the processor 101, for example) by which the machine learning device 100 itself learns items of a test to be executed next time with respect to an operation state of the manufacturing machine 70 and specifications of the manufacturing machine 70 through so-called machine learning. What the machine learning device 100 included in the testing device 1 learns corresponds to a model structure representing a correlation of an operation state of the manufacturing machine 70 and specifications of the manufacturing machine 70 with respect to items of a test to be executed next time.

As illustrated in the functional block of FIG. 2, the machine learning device 100 included in the testing device 1 includes a state observation unit 106, a determination data acquisition unit 108, and a learning unit 110. The state observation unit 106 observes test item data S1 representing items of a test to be executed next time, manufacturing machine operation state data S2 representing an operation state of the manufacturing machine 70, and manufacturing machine specification data S3 representing specifications of the manufacturing machine 70, as state variables S representing a current state of an environment. The determination data acquisition unit 108 acquires determination data D including operation state determination data D1 representing a suitability determination result of an operation state of the manufacturing machine 70 obtained when an item of a test to be executed next time is executed. The learning unit 110 performs learning by using the state variables S and the determination data D while associating an operation state of the manufacturing machine 70 and specifications of the manufacturing machine 70 with the test item data S1.

Among the state variables S observed by the state observation unit 106, the test item data S1 may be acquired as a set of operation commands related to a test for the manufacturing machine 70. Examples of the operation command related to a test for the manufacturing machine 70 include a combination of a control command with respect to a power source (rapid voltage rise, rapid voltage drop, and instantaneous interruption, for example), a list of parameter values within and out of a settable range defined in specifications of the manufacturing machine 70 with respect to each unit of the manufacturing machine 70, current control with respect to each motor provided to the manufacturing machine 70, a command to peripheral devices provided to the manufacturing machine 70, and the like. Such an operation command related to a test for the manufacturing machine 70 varies depending on functions provided to the manufacturing machine 70 and peripheral devices of the manufacturing machine 70, for example, and settable ranges of parameters also vary depending on specifications of the manufacturing machine 70. The state observation unit 106 may be configured to be capable of defining an operation command related to a test for the manufacturing machine 70 as a dynamic command (a waveform representing fluctuation of a value in a predetermined temporal width, for example, a waveform representing variation of a current value outputted to a motor) as well as a static command (value).

A combination of commands, which are comprehensively created by the testing device 1 based on specifications of the manufacturing machine 70, for controllable power source, parameter, motor, or peripheral devices of the manufacturing machine 70 may be used as the test item data S1 or the test item data S1 may be acquired from a set of test items used in the past tests, for example, in the initial stage of learning. Further, an item of a test to be executed next time, which is determined by the machine learning device 100 based on a learning result of the learning unit 110 at the preceding learning cycle, can be used as the test item data S1, at the stage on which the learning advances to some extent. In such a case, the machine learning device 100 may temporarily store the determined item of the test to be executed next time in the RAM 103 in every learning cycle and the state observation unit 106 may acquire, from the RAM 103, the item of the test to be executed next time which are determined by the machine learning device 100 in the preceding learning cycle.

As the manufacturing machine operation state data S2 among the state variables S, data may be used that is related to an operation state of the manufacturing machine 70 and is analyzed based on information of a current value and the like acquired from each unit of the manufacturing machine 70 and a detection value acquired from the sensor 60, for example. As the manufacturing machine operation state data S2, various values for evaluating an operation state of the manufacturing machine 70 may be handled such as a load and a vibration value of a motor analyzed based on a current value of the motor driving each unit of the manufacturing machine 70, impact sound detected by the sensor 60 serving as a sound sensor, a moving state of each unit of the manufacturing machine 70 detected by the sensor 60 serving as a visual sensor, a temperature of each unit of the manufacturing machine 70 detected by the sensor 60 serving as a temperature sensor, and the like.

As the manufacturing machine specification data S3 among the state variables S, specifications of the manufacturing machine 70 which are set with respect to the testing device 1 by an operator, for example, may be used. As this manufacturing machine specification data S3, a list of controllable control items of the manufacturing machine 70 and ranges of values which can be taken by respective control items, for example, are used.

The determination data acquisition unit 108 can use, as the determination data D, the operation state determination data D1 which is a suitability determination value of an operation state of the manufacturing machine 70 which is obtained when an item of a test to be executed next time is executed. This determination data D used by the determination data acquisition unit 108 includes whether a load of a motor driving each unit of the manufacturing machine 70 is within an appropriate load range, whether vibration has occurred, whether an impact has occurred in the manufacturing machine 70, whether the manufacturing machine 70 is on an appropriate position, whether a temperature of each unit of the manufacturing machine 70 is within an appropriate range, and the like, for example. The determination data D is an index representing effectiveness of an operation command of a test which is issued to the manufacturing machine 70 based on the state variables S.

The state variables S simultaneously inputted into the learning unit 110 are based on data in a learning cycle prior to a learning cycle in which the determination data D is acquired, in terms of a learning cycle of the learning unit 110. Thus, while the machine learning device 100 included in the testing device 1 advances learning, acquisition of the manufacturing machine operation state data S2 and the manufacturing machine specification data S3, execution of suitability determination of an operation state of the manufacturing machine 70 based on the test item data S1, and acquisition of the determination data D are repeatedly executed in an environment.

The learning unit 110 learns the test item data S1 with respect to an operation state of the manufacturing machine 70 and specifications of the manufacturing machine 70 in accordance with arbitrary learning algorithms collectively called machine learning. The learning unit 110 is capable of repeatedly executing learning based on a data set including the state variables S and the determination data D described above. During the repetition of a learning cycle of the test item data S1 with respect to an operation state of the manufacturing machine 70 and specifications of the manufacturing machine 70, the manufacturing machine operation state data S2 and the manufacturing machine specification data S3 are acquired from an analysis result of information acquired from the manufacturing machine 70 and the sensor 60 at the preceding learning cycle as described above and information which is set in the non-volatile memory 14 and is related to specifications of the manufacturing machine 70, and the test item data S1 is set as an item of a test to be executed next time which is determined based on learning results until the preceding test, among the state variables S; and the determination data D is set as a suitability determination result of an operation state of the manufacturing machine 70 in the current cycle of learning executed after the item of the test based on the test item data S1 is executed.

Through repetition of such a learning cycle, the learning unit 110 can automatically identify a feature indicating a correlation of an operation state of the manufacturing machine 70 (the manufacturing machine operation state data S2) and specifications of the manufacturing machine 70 (the manufacturing machine specification data S3) with respect to an item of a test to be executed next time corresponding to this state. Though the correlation of the manufacturing machine operation state data S2 and the manufacturing machine specification data S3 with respect to an item of a test to be executed next time is substantially unknown at the start of the learning algorithm, the learning unit 110 gradually identifies features as the learning unit 110 advances the learning and thus, interprets the correlation. When the correlation of the manufacturing machine operation state data S2 and the manufacturing machine specification data S3 with respect to an item of a test to be executed next time is interpreted to some reliable level, a learning result which is repeatedly outputted by the learning unit 110 can be used for performing selection (that is, decision-making) of an action for setting an item of a test to be executed next time with respect to a current state (that is, an operation state of the manufacturing machine 70 and specifications of the manufacturing machine 70). That is, the learning unit 110 is capable of gradually bringing the correlation of an operation state of the manufacturing machine 70 and specifications of the manufacturing machine 70 with respect to an action for determining values of an item of a test to be executed next time for the corresponding state, to an optimal solution along with advancement of the learning algorithm.

An inference result output unit 122 infers an item of a test to be executed next time, based on a result obtained through learning of the learning unit 110 and outputs the inference result to the control unit 34. When an operation state of the manufacturing machine 70 and specifications of the manufacturing machine 70 are inputted into the machine learning device 100 in a state that learning by the learning unit 110 is completed, the inference result output unit 122 outputs an item of a test to be executed next time.

In the machine learning device 100 included in the testing device 1, the learning unit 110 learns an item of a test to be executed next time in accordance with a machine learning algorithm by using the state variables S observed by the state observation unit 106 and the determination data D acquired by the determination data acquisition unit 108, as described above. The state variables S are composed of the test item data S1, the manufacturing machine operation state data S2, and the manufacturing machine specification data S3, and the determination data D can be uniquely obtained by analyzing information acquired from the manufacturing machine 70 and the sensor 60 by the testing device 1. Thus, according to the machine learning device 100 included in the testing device 1, it is possible to automatically and accurately obtain an item of a test to be executed next time, which corresponds to an operation state of the manufacturing machine 70 and specifications of the manufacturing machine 70, by using a learning result of the learning unit 110.

If an item of a test to be executed next time can be automatically obtained, an appropriate value of an item of a test to be executed next time can be rapidly determined only by grasping an operation state of the manufacturing machine 70 (the manufacturing machine operation state data S2) and specifications of the manufacturing machine 70 (the manufacturing machine specification data S3). Thus, an item of a test to be executed next time can be efficiently determined.

Figure 3:
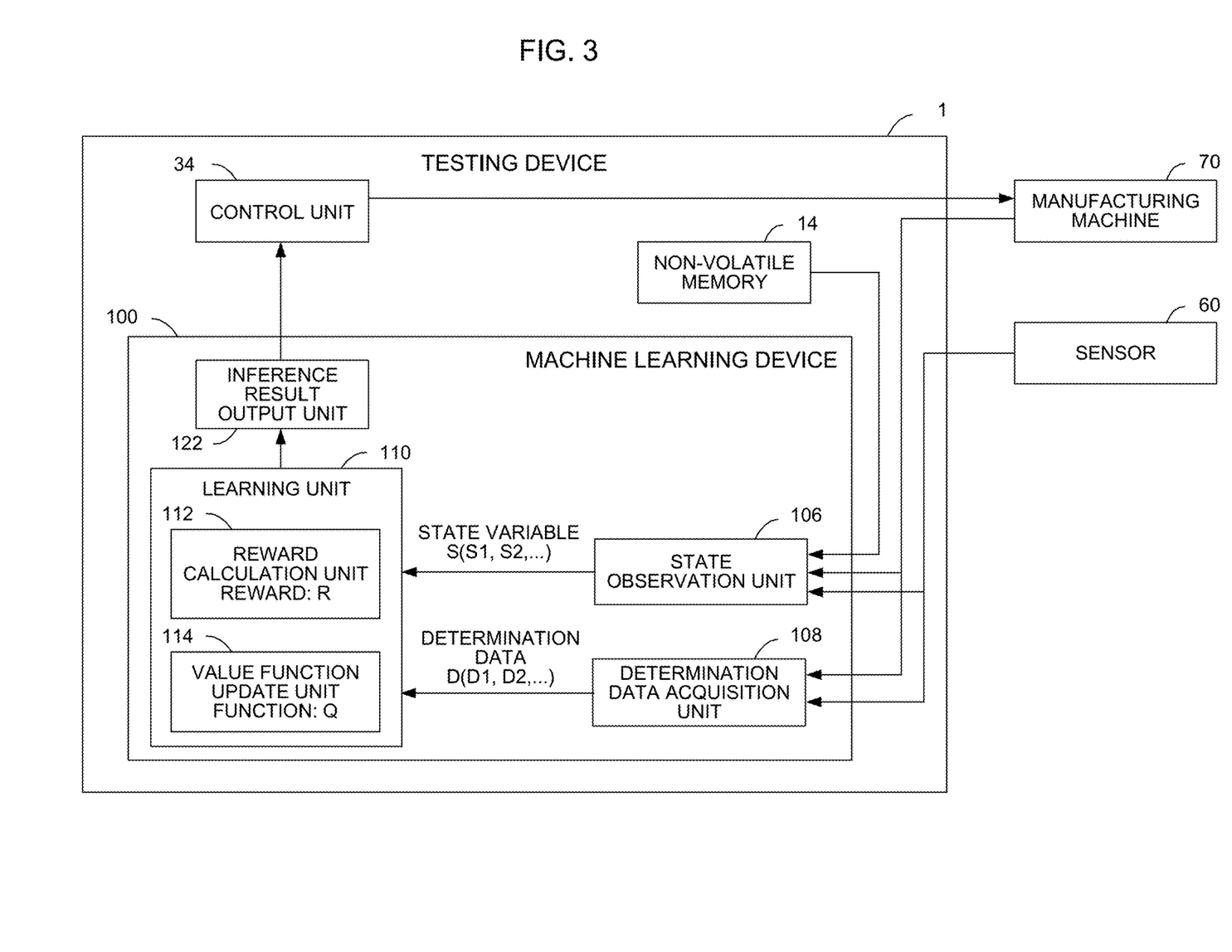
FIG. 3 is a functional block diagram schematically illustrating an embodiment of the testing device.

In the machine learning device 100 having the above-described configuration, a learning algorithm executed by the learning unit 110 is not especially limited but a known learning algorithm can be employed as machine learning. FIG. 3 illustrates an example of the testing device 1 illustrated in FIG. 2 and illustrates the configuration including the learning unit 110 which executes reinforcement learning as an example of the learning algorithm.

The reinforcement learning is a method in which a cycle, in which a predetermined action (that is, an output) is executed in a current state of an environment in which a learning object exists while observing the current state (that is, an input) and some reward is imparted with respect to the action, is repeated through trial and error so as to learn measures, by which a total reward is maximized, (an item of a test to be executed next time in the machine learning device in the present application) as an optimal solution.

In the machine learning device 100 included in the testing device 1 illustrated in FIG. 3, the learning unit 110 includes a reward calculation unit 112 and a value function update unit 114. The reward calculation unit 112 obtains reward R related to a suitability determination result (corresponding to the determination data D used in a learning period following a learning period in which the state variables S are acquired) of an operation state of the manufacturing machine 70 obtained when an item of a test to be executed next time is executed based on the state variables S. The value function update unit 114 updates function Q representing a value of an item of a test to be executed next time, by using the reward R. The learning unit 110 learns an item of a test to be executed next time with respect to an operation state of the manufacturing machine 70 and specifications of the manufacturing machine 70, through repeated update of the function Q performed by the value function update unit 114.

An example of an algorithm of the reinforcement learning executed by the learning unit 110 will be described below. The algorithm in this example is known as Q-learning and is a method for learning the function Q(s,a) representing a value of an action in the case where action a is selected in a state s when the state s of a subject of an action and the action a which can be selected by the subject of the action in the state s are set as independent variables. To select the action a to which the value function Q reaches the highest in the state s is an optimal solution. The Q-learning is started in a state in which a correlation between the state s and the action a is unknown and trial and error in selection of various actions a are repeated in an arbitrary state s. Thus, the value function Q is repeatedly updated so as to approach the optimal solution. Here, the configuration is employed in which when an environment (that is, the state s) is changed as a result of selection of the action a in the state s, reward r (that is, weighting of the action a) corresponding to the change can be obtained, and the learning is guided so as to select the action a by which higher reward r can be obtained. Thus, the value function Q can be approximated to the optimal solution in a relatively short period of time.

An update formula of the value function Q can be generally expressed as Formula (1) below. In Formula (1), $s_t$ and $a_t$ respectively denote a state and an action at time t and the state is changed to $s_{t+1}$ depending on the action $a_t$. $r_{t+1}$ denotes reward which is obtained when the state is changed from $s_t$ to $s_{t+1}$. A term of maxQ denotes Q obtained when the action a, in which the maximum value function Q is obtained at time t+1 (it is considered at time t that the maximum value function Q is obtained at time t+1), is performed. α and γ respectively denote a learning coefficient and a discount rate and are arbitrarily set as 0<α≤1 and 0<γ≤1.

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the case where the learning unit 110 executes the Q-learning, the state variable S observed by the state observation unit 106 and the determination data D acquired by the determination data acquisition unit 108 correspond to the state s in an update formula, the way to determine an item of a test to be executed next time with respect to a current state (that is, an operation state of the manufacturing machine 70 and specifications of the manufacturing machine 70) corresponds to the action a in the update formula, and the reward R obtained by the reward calculation unit 112 corresponds to the reward r in the update formula. Accordingly, the value function update unit 114 repeatedly updates the function Q representing values of an item of a test to be executed next time with respect to a current state, by the Q-learning using the reward R.

Regarding the reward R obtained by the reward calculation unit 112, for example, (1) if a suitability determination result of an operation state of the manufacturing machine 70 is determined as "suitable" when an operation command is outputted to the manufacturing machine 70 based on an item of a test determined after determination of an item of a test to be executed next time (for example, when a load equal to or larger than a predetermined threshold value is generated in a motor, when vibration equal to or larger than a predetermined threshold value occurs in the manufacturing machine 70, when an error equal to or larger than a predetermined threshold value is generated in presumed axis movement, and when an operation of the manufacturing machine 70 becomes unstable), the reward R obtained by the reward calculation unit 112 may be set as positive (plus) reward R; and (2) if a suitability determination result of an operation state of the manufacturing machine 70 is determined as "unsuitable" when an operation command is outputted to the manufacturing machine 70 based on an item of a test determined after determination of an item of a test to be executed next time (for example, when a load smaller than a predetermined threshold value is generated in a motor, when vibration smaller than a predetermined threshold value occurs in the manufacturing machine 70, when an error smaller than a predetermined threshold value is generated in presumed axis movement, and when an operation of the manufacturing machine 70 becomes stable), the reward R obtained by the reward calculation unit 112 may be set as negative (minus) reward R.

In the above case, absolute values of the positive and negative rewards R may be identical to each other or different from each other. As for a condition of the determination, the determination may be performed by combining a plurality of values included in the determination data D.

Further, a suitability determination result of an operation state of the manufacturing machine 70 may be set not only in two ways which are "suitable" and "unsuitable" but also in multiple stages. As an example, when the maximum value of the allowable range of a load occurring in a motor is $T_{max}$, the configuration may be employed in which reward R=1 is imparted when load T occurring in a motor is 0≤T<$T_{max}$/5, reward R=2 is imparted when the load T is $T_{max}$/5≤T<$T_{max}$/2, reward R=3 is imparted when the load T is $T_{max}$/2≤T<$T_{max}$, and reward R=5 is imparted when the load T is $T_{max}$≤T. Further, the configuration may also be employed in which $T_{max}$ is set relatively large in the initial stage of the learning and $T_{max}$ is reduced along with advancement of the learning.

The value function update unit 114 can have an action value table in which the state variables S, the determination data D, and the rewards R are organized in a manner such that they are associated with action values (for example, numeral values) expressed by the function Q. In this case, an action for updating the function Q by the value function update unit 114 is equivalent to an action for updating the action value table by the value function update unit 114. Since the correlation between a current state of an environment and an item of a test to be executed next time is unknown at the start of the Q-learning, various state variables S, determination data D, and rewards R are prepared in a manner to be associated with values of action values (functions Q) defined on a random basis in the action value table. The reward calculation unit 112 is capable of calculating the reward R corresponding to determination data D as soon as the reward calculation unit 112 gets to know the determination data D, and the calculated value R is written in the action value table.

As the Q-learning is advanced by using the reward R corresponding to a suitability determination result of an operation state of the manufacturing machine 70, the learning is guided to select an action for which higher reward R can be obtained, and a value of the action value (function Q) for an action performed in a current state is rewritten in accordance with a state of an environment (that is, the state variable S and the determination data D) which is changed as a result of execution of the selected action in the current state. Thus, the action value table is updated. Through repetition of this updating, a value of an action value (function Q) displayed on the action value table is rewritten to be a larger value as the action is more appropriate (the action for making the manufacturing machine 70 unstable in the present invention). Thus, a correlation, which is unknown, between a current state of an environment (an operation state of the manufacturing machine 70 and specifications of the manufacturing machine 70) and a corresponding action (determination of an item of a test to be executed next time) gradually becomes apparent. That is, a relation of an operation state of the manufacturing machine 70 and specifications of the manufacturing machine 70 with respect to an item of a test to be executed next time is gradually approximated to an optimal solution through updating of the action value table.

Figure 4:
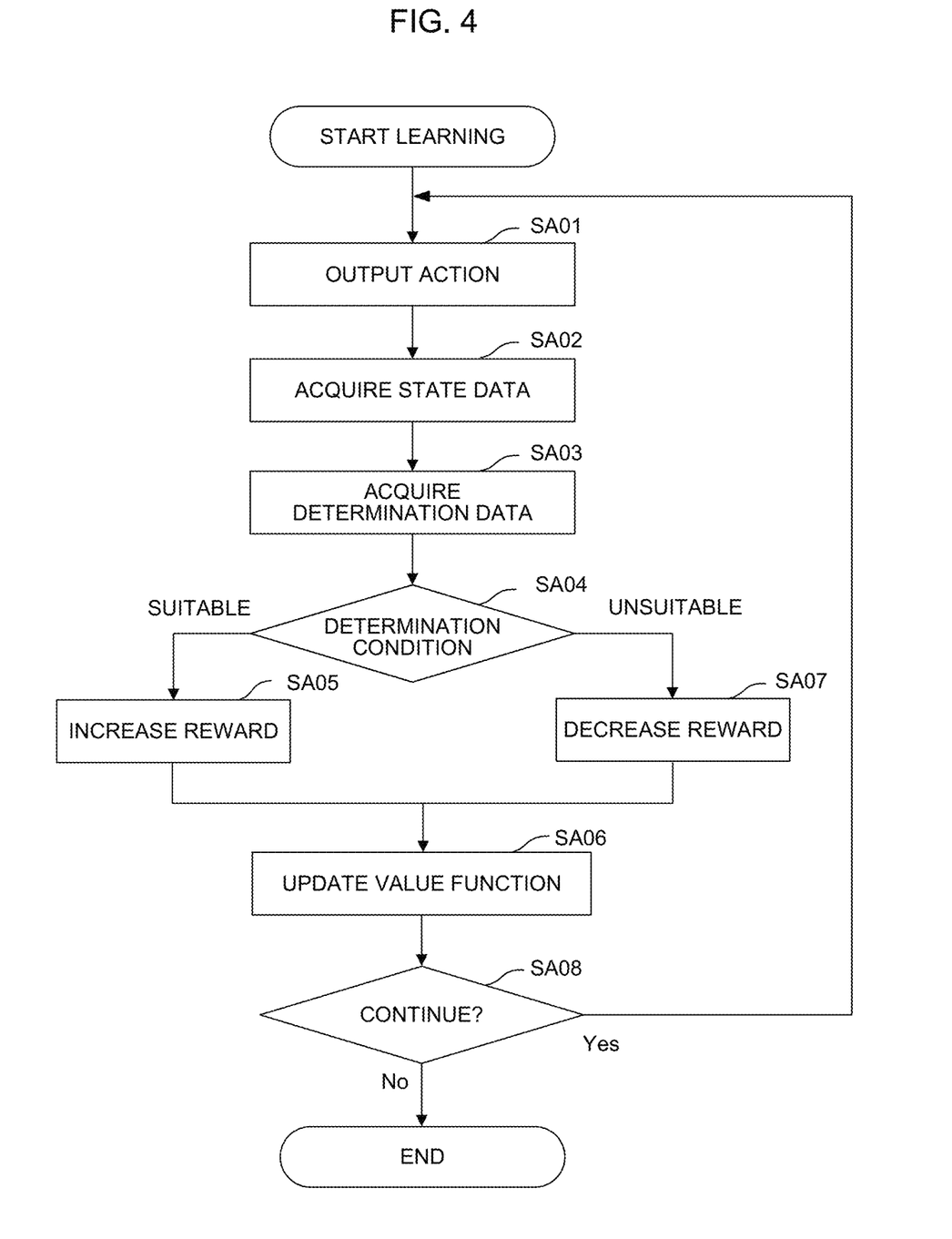
FIG. 4 is a flowchart schematically illustrating an embodiment of a machine learning method.

A flow of the above-described Q-learning executed by the learning unit 110 (that is, an aspect of the machine learning method) is further described in reference to FIG. 4.

First, in step SA01, the value function update unit 114 selects an item of a test to be executed next time at random as an action, which is performed in a current state represented by the state variable S observed by the state observation unit 106, while referring to the action value table at that time. Then, the value function update unit 114 takes in the state variable S of the current state observed by the state observation unit 106 in step SA02 and takes in the determination data D of the current state acquired by the determination data acquisition unit 108 in step SA03. Subsequently, the value function update unit 114 determines whether or not the item of the test to be executed next time is suitable, based on the determination data D in step SA04. In the case where the item of the test to be executed next time is suitable, the positive reward R obtained by the reward calculation unit 112 is applied to an update formula of the function Q in step SA05 and then, the action value table is updated by using the state variable S, the determination data D, the reward R, and the value of the action value (the function Q after update) in the current state in step SA06. In the case where it is determined in step SA04 that the item of the test to be executed next time is not suitable, the negative reward R obtained by the reward calculation unit 112 is applied to the update formula of the function Q in step SA07 and then, the action value table is updated by using the state variable S, the determination data D, the reward R, and the value of the action value (the function Q after update) in the current state in step SA06. The learning unit 110 repeatedly updates the action value table by repeating steps SA01 to SA07 so as to advance the learning of the item of the test to be executed next time. Here, the processing for obtaining the reward R and the processing for updating the value function performed from step SA04 to step SA07 are performed for each data included in the determination data D.

Figure 5A:
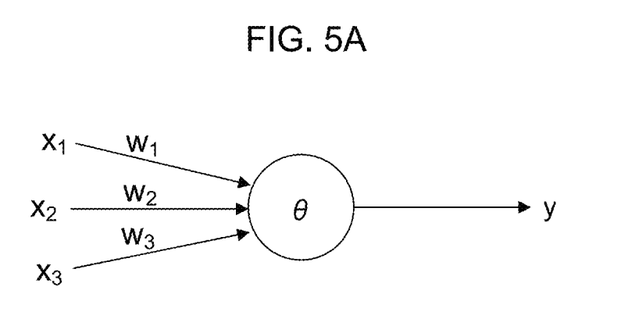
FIG. 5A illustrates a neuron.
Figure 5B:
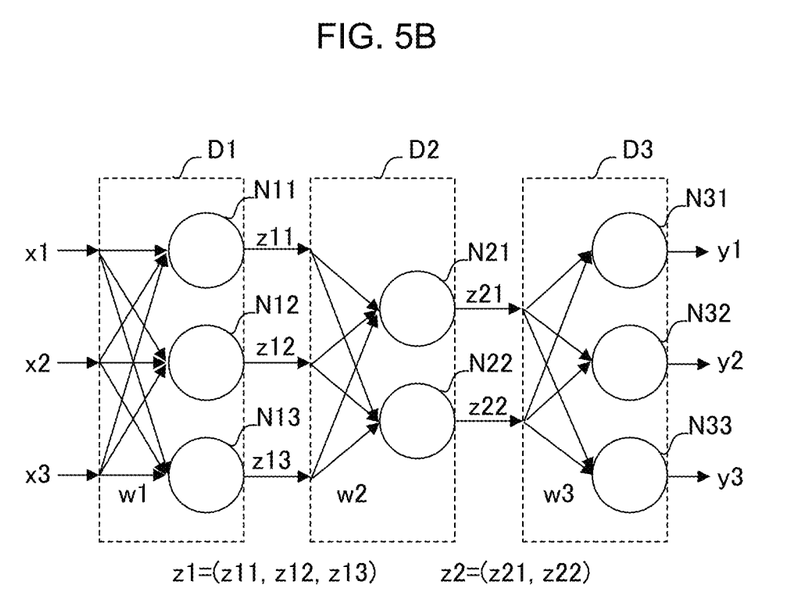
FIG. 5B illustrates a neural network.

When the above-described reinforcement learning is advanced, a neural network, for example, is applicable. FIG. 5A schematically illustrates a model of a neuron. FIG. 5B schematically illustrates a model of a three-layered neural network which is configured by combining the neurons illustrated in FIG. 5A. The neural network can be composed of arithmetic devices, storage devices, or the like, for example, in imitation of the model of neurons.

The neuron illustrated in FIG. 5A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly, the neuron outputs the output y expressed by Formula (2) below. Here, in Formula (2), all of inputs x, results y, and weights w are vectors. Further, θ denotes a bias and $f_k$ denotes an activation function.

$$y = f_k(\Sigma_{i=1}^{n} x_i w_i - \theta) \quad (2)$$

In the three-layered neural network illustrated in FIG. 5B, a plurality of inputs x (inputs x1, x2, x3 as an example here) are inputted from the left side and results y (results y1, y2, y3 as an example here) are outputted from the right side. In the example illustrated in FIG. 5B, inputs x1, x2, x3 are each multiplied by corresponding weights (collectively denoted by $w_1$) and each of inputs x1, x2, x3 is inputted into three neurons N11, N12, N13.

In FIG. 5B, an output of each of the neurons N11, N12, N13 is collectively denoted by z1. z1 can be considered as a feature vector obtained by extracting a feature amount of an input vector. In the example illustrated in FIG. 5B, feature vectors z1 are each multiplied by corresponding weights (collectively denoted by w2) and each of feature vectors z1 is inputted into two neurons N21, N22. Feature vector z1 represents a feature between weight w1 and weight w2.

In FIG. 5B, an output of each of the neurons N21, N22 is collectively denoted by z2. z2 can be considered as a feature vector obtained by extracting a feature amount of feature vector z1. In the example illustrated in FIG. 5B, feature vectors z2 are each multiplied by corresponding weights (collectively denoted by w3) and each of feature vectors z2 is inputted into three neurons N31, N32, N33. Feature vector z2 represents a feature between weight w2 and weight w3. Finally, neurons N31 to N33 respectively output results y1 to y3.

Here, the method of so-called deep learning in which a neural network having three or more layers is used may be employed as well.

In the machine learning device 100 included in the testing device 1, the learning unit 110 performs calculation of the multilayer structure following the above-described neural network by using the state variable S and the determination data D as inputs x so as to be able to output an item of a test to be executed next time (results y). Further, in the machine learning device 100 included in the testing device 1, the learning unit 110 performs calculation of the multilayer structure following the above-described neural network by using the neural network as a value function in the Q-learning and using the state variable S and the action a as inputs x so as to be able to output values (results y) of the action in this state as well. Here, operation modes of the neural network include a learning mode and a value prediction mode. For example, weight w can be learned by using a learning data set in the learning mode and value determination of an action can be performed by using the learned weight w in the value prediction mode. Here, detection, classification, inference, and the like can also be performed in the value prediction mode.

The above-described configuration of the testing device 1 can be described as a machine learning method (or software) executed by the processor 101. This machine learning method is a machine learning method for learning an item of a test to be executed next time. The machine learning method includes: a step of observing the test item data S1, the manufacturing machine operation state data S2, and the manufacturing machine specification data S3, as the state variables S representing a current state of an environment in which the manufacturing machine 70 is tested; a step of acquiring the determination data D representing a suitability determination result of an operation state of the manufacturing machine 70 based on determined operation parameters; and a step of learning the manufacturing machine operation state data S2, the manufacturing machine specification data S3, and an item of a test to be executed next time by using the state variables S and the determination data D in a state where the manufacturing machine operation state data S2 and the manufacturing machine specification data S3 are associated with the item of the test to be executed next time. These steps are executed by a CPU of a computer.

Figure 6:
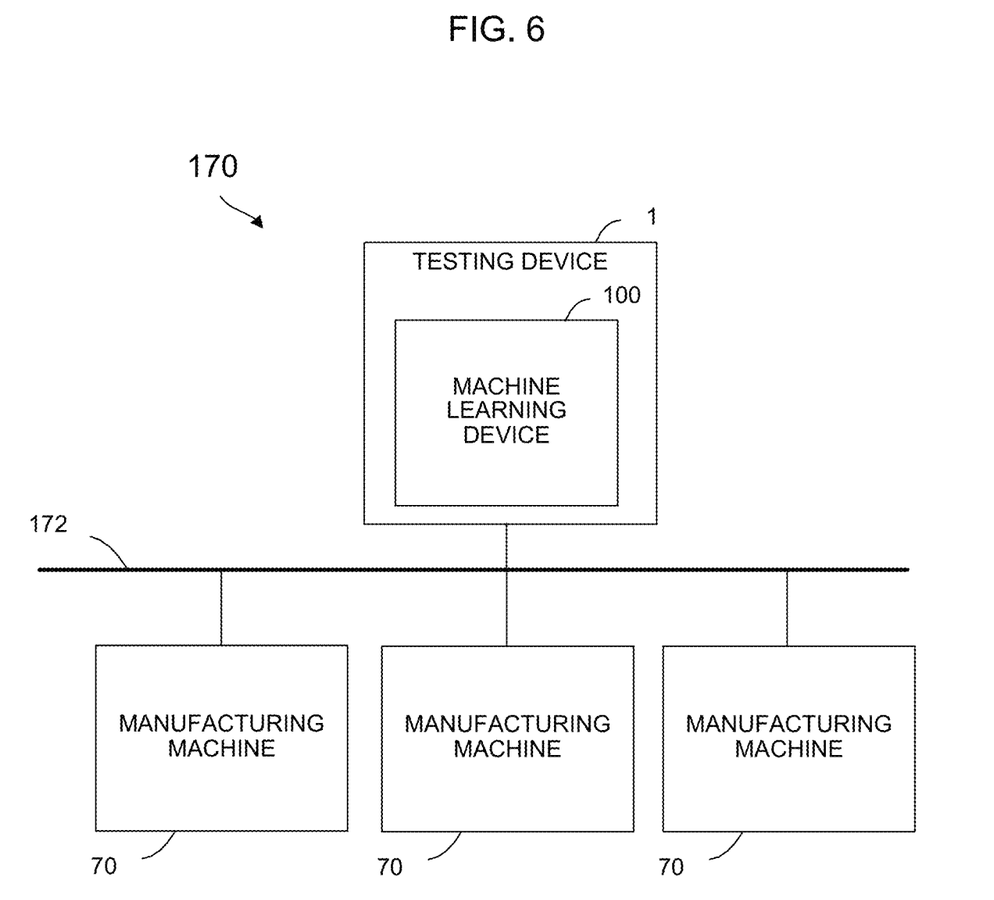
FIG. 6 is a functional block diagram schematically illustrating an embodiment of a system in which a testing device is incorporated.

FIG. 6 illustrates a system 170, according to an embodiment, including the testing device 1.

The system 170 includes at least one testing device 1 which is mounted as a part of a computer such as a cell computer, a host computer, and a cloud server, a plurality of manufacturing machines 70 which are objects of a test, and a wired/wireless network 172 which connects the testing device 1 and the manufacturing machines 70 to each other.

In the system 170 having the above-described configuration, the testing device 1 including the machine learning device 100 is capable of automatically and accurately obtaining an item of a test to be executed next time with respect to operation states of the manufacturing machines 70 and specifications of the manufacturing machines 70 by using a learning result of the learning unit 110. Further, the system 170 may be configured so that the machine learning device 100 of the testing device 1 learns an item of a test to be executed next time common to all of the manufacturing machines 70 based on the state variables S and the determination data D, which are obtained for each of the plurality of manufacturing machines 70, and the learning result is shared in tests for all the manufacturing machines 70. According to the system 170, speed and reliability in learning of an item of a test to be executed next time can be improved by using more various data sets (including the state variables S and the determination data D) as inputs.

The embodiment of the present invention has been described above, but the present invention can be embodied in various aspects by adding arbitrary alterations, without being limited to the examples of the above-described embodiment.

For example, the learning algorithm and calculation algorithm executed by the machine learning device 100, the control algorithm executed by the testing device 1, and the like are not limited to the above-mentioned algorithms, but various algorithms may be employed.

The above-described embodiment includes the description that the testing device 1 and the machine learning device 100 are devices including CPUs different from each other, but the machine learning device 100 may be realized by the CPU 11 included in the testing device 1 and the system program stored in the ROM 12.

The invention claimed is:

1. A testing device for testing a manufacturing machine at a development stage of the manufacturing machine to search for a test item that causes the manufacturing machine to become unstable, the testing device being configured to determine the test item with respect to an operation state of the manufacturing machine and specifications of the manufacturing machine, using at least one processor, the testing device comprising:
a machine learning device that learns determination of the test item with respect to the manufacturing machine, wherein
the machine learning device includes:
a state observation unit that observes test item data representing the test item, manufacturing machine operation state data representing the operation state of the manufacturing machine, and manufacturing machine specification data representing specifications of the manufacturing machine, as a state variable representing a current state of an environment;
a determination data acquisition unit that acquires determination data representing a suitability determination result of the operation state of the manufacturing machine, the suitability determination result being obtained when the test item is executed;
a learning unit that performs learning by using the state variable and the determination data of one or more previous cycles, such that the manufacturing machine operation state data and the manufacturing machine specification data are used to determine the test item to be performed at a next cycle; and
an inference result output unit that outputs an operation command of a test based on the test item, based on the state variable observed by the state observation unit and a learning result obtained by the learning unit.

2. The testing device according to claim 1, wherein
the learning unit includes:
a reward calculation unit that obtains a reward related to the suitability determination result; and
a value function update unit that updates a function representing a value of the test item with respect to the operation state of the manufacturing machine and specifications of the manufacturing machine, by using the reward, wherein
the reward calculation unit calculates a higher reward as an operation of the manufacturing machine becomes more unstable.

3. The testing device according to claim 1, wherein the learning unit calculates the state variable and the determination data in a multilayer structure.

4. A testing device for testing a manufacturing machine at a development stage of the manufacturing machine to search for a test item that causes the manufacturing machine to become unstable, using at least one processor, wherein
the testing device is configured to determine the test item with respect to an operation state of the manufacturing machine and specifications of the manufacturing machine and the testing device comprises a machine learning device that has learned determination of the test item with respect to the manufacturing machine, and
the machine learning device includes:
a state observation unit that observes test item data representing the test item, manufacturing machine operation state data representing the operation state of the manufacturing machine, and manufacturing machine specification data representing specifications of the manufacturing machine, as a state variable representing a current state of an environment;

a learning unit that has performed learning in a state where the manufacturing machine operation state data and the manufacturing machine specification data are used to determine the test item to be performed at a next cycle; and an inference result output unit that outputs an operation command of a test based on the test item, based on the state variable observed by the state observation unit and a learning result obtained by the learning unit.

5. The testing device according to claim 1, wherein the machine learning device exists in a cloud server.

6. The testing device according to claim 4, wherein the machine learning device exists in a cloud server.

7. A machine learning device for testing a manufacturing machine at a development stage of the manufacturing machine to search for a test item that causes the manufacturing machine to become unstable, using at least one processor, the machine learning device comprising:

a state observation unit that observes test item data representing the test item, manufacturing machine operation state data representing an operation state of the manufacturing machine, and manufacturing machine specification data representing specifications of the manufacturing machine, as a state variable representing a current state of an environment;

a determination data acquisition unit that acquires determination data representing a suitability determination result of the operation state of the manufacturing machine, the suitability determination result being obtained when the test item is executed;

a learning unit that performs learning by using the state variable and the determination data of one or more previous cycles, such that the manufacturing machine operation state data and the manufacturing machine specification data are used to determine the test item to be performed at a next cycle; and an inference result output unit that outputs an operation command of a test based on the test item, based on the state variable observed by the state observation unit and a learning result obtained by the learning unit.

8. A machine learning device for testing a manufacturing machine at a development stage of the manufacturing machine to search for a test item that causes the manufacturing machine to become unstable, using at least one processor, the machine learning device comprising:

a state observation unit that observes test item data representing the test item, manufacturing machine operation state data representing an operation state of the manufacturing machine, and manufacturing machine specification data representing specifications of the manufacturing machine, as a state variable representing a current state of an environment;

a learning unit that performs learning in a state where the manufacturing machine operation state data and the manufacturing machine specification data are used to determine the test item to be performed at a next cycle; and an inference result output unit that outputs an operation command of a test based on the test item, based on the state variable observed by the state observation unit and a learning result obtained by the learning unit.

* * * * *